United States Patent
Tolpin et al.

(10) Patent No.: US 10,152,591 B2
(45) Date of Patent: Dec. 11, 2018

(54) PROTECTING AGAINST MALWARE VARIANTS USING RECONSTRUCTED CODE OF MALWARE

(71) Applicant: PAYPAL, INC., San Jose, CA (US)

(72) Inventors: David Tolpin, Beer Sheva (IL); Shlomi Boutnaru, Modiin (IL); Yuri Shafet, Beer Sheva (IL)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/230,315

(22) Filed: Aug. 5, 2016

(65) Prior Publication Data
US 2017/0032120 A1    Feb. 2, 2017

Related U.S. Application Data

(63) Continuation-in-part of application No. 14/404,457, filed as application No. PCT/IL2014/050144 on Feb. 10, 2014, now Pat. No. 9,521,156.

(60) Provisional application No. 61/762,922, filed on Feb. 10, 2013.

(51) Int. Cl.
  *G06F 21/53*    (2013.01)
  *G06F 21/56*    (2013.01)
  *H04L 29/06*    (2006.01)

(52) U.S. Cl.
  CPC .......... *G06F 21/53* (2013.01); *G06F 21/564* (2013.01); *G06F 21/566* (2013.01); *G06F 21/567* (2013.01); *H04L 63/145* (2013.01); *G06F 2221/033* (2013.01); *G06F 2221/2145* (2013.01); *H04L 63/1416* (2013.01)

(58) Field of Classification Search
  CPC ...... G06F 21/53; G06F 21/564; G06F 21/566; G06F 21/567; H04L 63/145
  See application file for complete search history.

(56) References Cited

U.S. PATENT DOCUMENTS

6,006,328 A * 12/1999 Drake ..................... G06F 21/14
                                                    713/188
6,253,370 B1 * 6/2001 Abadi ..................... G06F 9/445
                                                    713/182

(Continued)

FOREIGN PATENT DOCUMENTS

CN      101231683      7/2008
EP      2472425 A2     7/2012

(Continued)

OTHER PUBLICATIONS

Zhang et al., MetaAware: Identifying Metamorphic Malware, Dec. 2007, Twenty-Third Annual Computer Security Applications Conference, pp. 411-420 (Year: 2007).*

(Continued)

*Primary Examiner* — Kenneth W Chang
(74) *Attorney, Agent, or Firm* — Haynes and Boone, LLP

(57) ABSTRACT

A system for discovering programming variants. The system analyzes system calls from executing a program to generate programming code or executable for a particular OS and/or CPU that would perform the same or similar actions as the program. The code that is generated is then mutated, augmented, and/or changed to create variations of the program which still functions and/or obtains the same objectives as the original code.

20 Claims, 5 Drawing Sheets

(56) References Cited

U.S. PATENT DOCUMENTS

| | | | |
|---|---|---|---|
| 6,668,325 B1* | 12/2003 | Collberg | G06F 21/14 713/194 |
| 6,775,780 B1* | 8/2004 | Muttik | G06F 21/53 713/165 |
| 7,284,273 B1 | 10/2007 | Szor | |
| 7,430,670 B1* | 9/2008 | Horning | G06F 21/14 713/190 |
| 7,809,670 B2 | 10/2010 | Lee et al. | |
| 8,151,352 B1* | 4/2012 | Novitchi | G06F 9/45508 717/138 |
| 8,321,942 B1 | 11/2012 | Chiueh et al. | |
| 8,375,450 B1 | 2/2013 | Oliver et al. | |
| 8,510,836 B1 | 8/2013 | Nachenberg | |
| 2004/0064736 A1 | 4/2004 | Obrecht et al. | |
| 2004/0205411 A1* | 10/2004 | Hong | G06F 21/566 714/38.1 |
| 2005/0204150 A1* | 9/2005 | Peikari | G06F 21/568 713/188 |
| 2006/0037080 A1* | 2/2006 | Maloof | G06F 21/562 726/24 |
| 2007/0039048 A1* | 2/2007 | Shelest | G06F 21/52 726/22 |
| 2007/0094734 A1 | 4/2007 | Mangione-Smith et al. | |
| 2007/0233735 A1 | 10/2007 | Han et al. | |
| 2007/0240217 A1 | 10/2007 | Tuvell et al. | |
| 2007/0250927 A1 | 10/2007 | Naik et al. | |
| 2008/0201778 A1* | 8/2008 | Guo | G06F 21/552 726/23 |
| 2008/0263669 A1 | 10/2008 | Alme | |
| 2009/0044024 A1 | 2/2009 | Oberheide et al. | |
| 2009/0300761 A1 | 12/2009 | Park et al. | |
| 2010/0058473 A1 | 3/2010 | Breitenbacher | |
| 2010/0077481 A1 | 3/2010 | Polyakov et al. | |
| 2010/0162400 A1 | 6/2010 | Feeney et al. | |
| 2011/0219450 A1* | 9/2011 | McDougal | G06F 21/56 726/23 |
| 2011/0225655 A1 | 9/2011 | Niemela et al. | |
| 2012/0072988 A1* | 3/2012 | Agrawal | G06F 21/561 726/24 |
| 2012/0124121 A1* | 5/2012 | Pope | H04L 49/9094 709/201 |
| 2012/0174227 A1 | 7/2012 | Mashevsky et al. | |
| 2012/0304244 A1 | 11/2012 | Xie et al. | |
| 2013/0152200 A1 | 6/2013 | Alme et al. | |
| 2013/0283382 A1 | 10/2013 | Kim et al. | |
| 2014/0090061 A1 | 3/2014 | Avasarala et al. | |

FOREIGN PATENT DOCUMENTS

| | | |
|---|---|---|
| WO | WO 2011/119940 | 9/2011 |
| WO | WO 2012/091400 | 7/2012 |

OTHER PUBLICATIONS

Chouchane et al., "Using Markov Chains to Filter Machine-morphed Variants of Malicious Programs", 2008 3$^{rd}$ International Conference on Malicious and Unwanted Software (Malware), Oct. 7-8, 2008, pp. 77-84 , IEEE, Piscataway, New Jersey.

Zolkipli et al., "A Framework for Malware Detection Using Combination Technique and Signature Generation", ResearchGate, Second International Conference on Computer Research and Development, May 7-10, 2010, pp. 196-199, IEEE, Piscataway, New Jersey.

Alazab et al., "Zero-day Malware Detection based on Supervised Learning Algorithms of API call Signatures", Proceedings of the 94$^{th}$ Australasian Data Mining Conference (AusDM '11), Dec. 1-2, 2011, pp. 171-181, vol. 121, Australian Computer Society, Sydney, New South Wales, Australia.

European Search Report for Application No. 17182755.3 dated Oct. 24, 2017, 7 pgs.

* cited by examiner

PROTECTING AGAINST MALWARE VARIANTS USING RECONSTRUCTED CODE OF MALWARE

CROSS REFERENCE TO RELATED APPLICATIONS

This application is a continuation-in-part of U.S. application Ser. No. 14/404,457 filed on Nov. 27, 2014, which is the National Phase of PCT application number PCT/IL2014/050144 filed on Feb. 10, 2014, which claims priority from and benefit of U.S. Provisional Application No. 61/762,922, filed on Feb. 10, 2013, all of which are incorporated herein by reference in their entirety.

TECHNICAL FIELD

The present disclosure generally relates to information security, and more specifically, to reconstructing programming code or executable from a binary file based on system calls.

BACKGROUND

Malware is always evolving, and when a system discovers malware, it is mainly discovered in a binary format, which is the result of compiling the source code of the malware. Having the source code of the malware would be beneficial for analyzing the malware and determining how the malware may evolve over time, but the source code is usually not available. As such, it would be advantageous if there were a way to decompile malware into a programming language from system calls, binary files, and/or series of data packets from a network.

Figure 1:
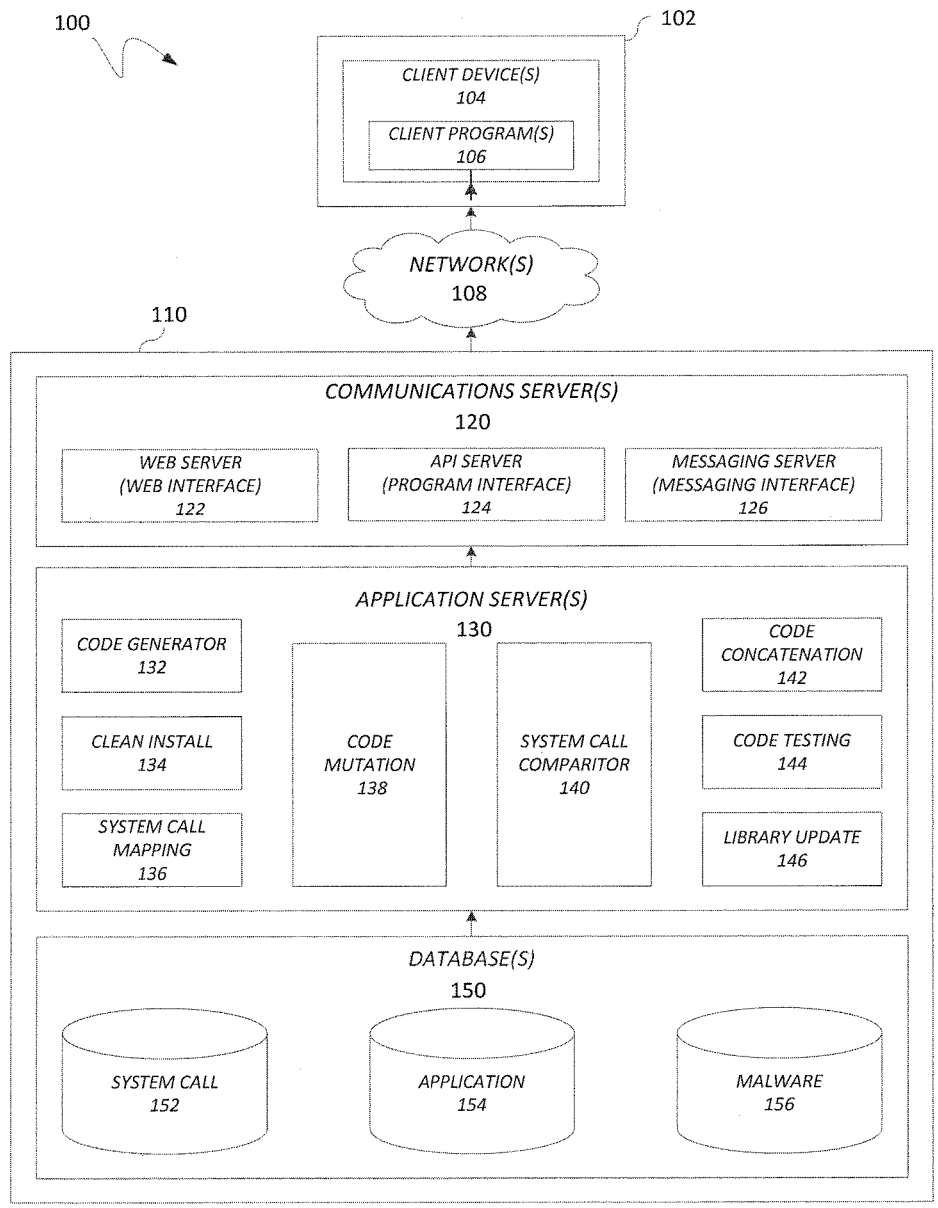
FIG. 1 is a block diagram of an exemplary computing system for protecting devices against malware variants from recreated source code.

The detailed description that follows provides several embodiments and advantages of the system of the present disclosure. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. However, persons skilled in the art would recognize that they may practice some embodiments without some or all of these specific details. The particular embodiments disclosed herein are meant to be illustrative but not limiting. One skilled in the art may realize other elements that, although not specifically described here, are within the scope and the spirit of this disclosure. Also, to avoid unnecessary repetition, one or more features shown and described in association with one embodiment may be incorporated into other embodiments unless expressly described otherwise or if the one or more features would make an embodiment non-functional.

Some embodiments of the present disclosure provide a way of detecting and removing malware, malicious code and/or computer viruses before a successful attack. Some examples of malware and/or computer viruses may be Trojan horses, rootkits, shellcodes, and/or the like. In many cases, an initial operation to removing malware is detecting the malware. A manner of detecting malware on a system is to have the system scan for malware using a library of known malware and their properties (e.g. pieces of code, malware techniques, and/or the like). This library may be updated regularly with newly discovered malware. New discoveries of malware often occur when someone notices a breach of security of some sort. The flow of such a system is the following: a security breach occurs by new malware, the system profiles or receives a profile of the malware, and then the system updates the malware library. In this manner, the system can now look for, find, and remove the newly discovered malware. The problem with this mode of detecting malware is that it is a reactive system rather than a preventative system. A security breach occurs and then later on the system responds by updating the malware library to detect future violations. This type of system cannot detect malware that has not already caused a security breach. To prevent the first breach in security, the system would have to predict the malware before it conducts an attack. Some of the embodiments of the present disclosure provide a system and method for predicting malware and protecting against the malware before a successful attack using the malware.

In some embodiments, the system predicts and protects against new variants of malware based on currently known malware. In some examples, the system may mutate, evolve, and/or create a new variant of (collectively referred to as "mutate" for simplicity) malware based on a currently known malware. For example, the system may mutate malware by adding lines of code; removing parts of code; replicating lines of code; rearranging lines of code; replacing a given command sequence with another, functionally equivalent, sequence of commands; adding malicious functionality like keylokking, hooking, and/oro the like; replacing a selected library call with a different, functionally equivalent, library call; replacing a selected library used with a different, functionally equivalent, library; and/or the like.

A system may be able to mutate malware from the binary executable or the source code. Mutating the source code may be better for finding implementation variations, however, a system is more likely to have the malware in binary format. Additionally, the malware may be hidden within another application. As such, in some embodiments, the system may include a way to isolate the malware from an otherwise normal, non-malicious application. Furthermore, the system may include a way to create source code or code associated with the malware, which may not be exactly the same as the original source code, but functionally similar and/or equivalent. In some examples, the source code may be determined based on the system calls that are a result of executing the malware. Different operating systems may have different system calls. Some typical Linux system calls include, but are not limited to "Socket," "Bind," "Dup2," and so forth. Similarly, some Windows® system calls include, but at not limited to ArbPreprocessEntry, NtAccessCheck, NtAddBootEntry, NtAlpcCreatePort, NtAlpcConnectPort, and soforth. As another example, OS X system calls include, but at not limited to, fork, open, close, link, and soforth. There are many more system calls for the operating systems listed and for other operating systems and/or other CPU architectures, all of which the system may be configured to recognize and/or handle.

In some embodiments, a system including one or more hardware processors coupled to the non-transitory memory is configured to perform operations. The operations may include receiving an application infected with a malware, malicious code, and/or computer virus; determining system calls corresponding to the computer virus based on the application infected with the computer virus; generating a first programming code based on the system calls; augmenting the first programming code to create a second programming code, the second programming code being different from the first programming code; and testing that the second programming code achieves an objective that is the same as the malware.

In some embodiments, a system including one or more hardware processors coupled to the non-transitory memory is configured to perform operations. The operations may include receiving an application infected with a malware, malicious code, and/or computer virus; determining system cal/s and/or library calls corresponding to the computer virus based on the application infected with the computer virus; generating a first system call and/or library call traces based on the system calls and/or library calls; augmenting the first system call and/or library call traces to create a second system call and/or library call traces, the second system call and/or library call traces being different from the first system call and/or library call traces; and testing that the second system call and/or library call traces achieves an objective that is the same as the malware, malicious code, and/or computer virus.

In some embodiments, a non-transitory machine readable stores machine-readable instructions executable to cause a machine to perforin operations including receiving a first executable, wherein running the executable causes an operation; determining system calls corresponding to executing the first executable; generating a first programming code from the system calls, wherein running the programming code causes the operation; and augmenting the first programming code to create a second programming code, the second programming code being different from the first programming of code, wherein running the second programming code causes the operation.

In some embodiments, a non-transitory machine readable stores machine-readable instructions executable to cause a machine to perform operations including receiving a first executable, wherein running the executable causes an operation; determining system calls and/or library calls corresponding to executing the first executable; generating a first system call and/or library call traces from the system calls and/or library calls, wherein running the system call and/or library call traces causes the operation; and augmenting the first system call and/or library call traces to create a second system call and/or library call traces, the second system call and/or library call traces being different from the first system call and/or library call traces, wherein running the second system call and/or library call traces causes the operation.

In some examples, a computer-implemented method includes determining a plurality of system calls corresponding to an execution of a first executable; generating a first plurality of code based on the plurality of system calls; creating a second plurality of code based on the first plurality of, the second plurality of code being a variation of the first plurality of code; determining a second executable corresponding to a compiling of the second plurality of code; and causing a computer system to be configured to detect the second executable.

FIG. 1 illustrates, in block diagram format, an exemplary embodiment of a computing system adapted for implementing one or more embodiments disclosed herein to protect devices against malware variants from recreated source code of detected malware. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers operating a operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicates with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be a server that provides various services to client devices, such as malware detection and/or malware library updates. Application servers 130 may include multiple servers and/or components. For example, application servers 130 may include a code generator 132, clean room 134, system call mapping engine 136, code mutation engine 138, system call comparison engine 140, code concatenation engine 142, testing engine 144, and/or library update engine 146. These servers and/or components, which may be in addition to other servers, may be structured and arranged to help protect devices against malware.

Application servers 130, in turn, may be coupled to and capable of accessing one or more databases 150 including system call database 152, application database 154, and/or malware database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
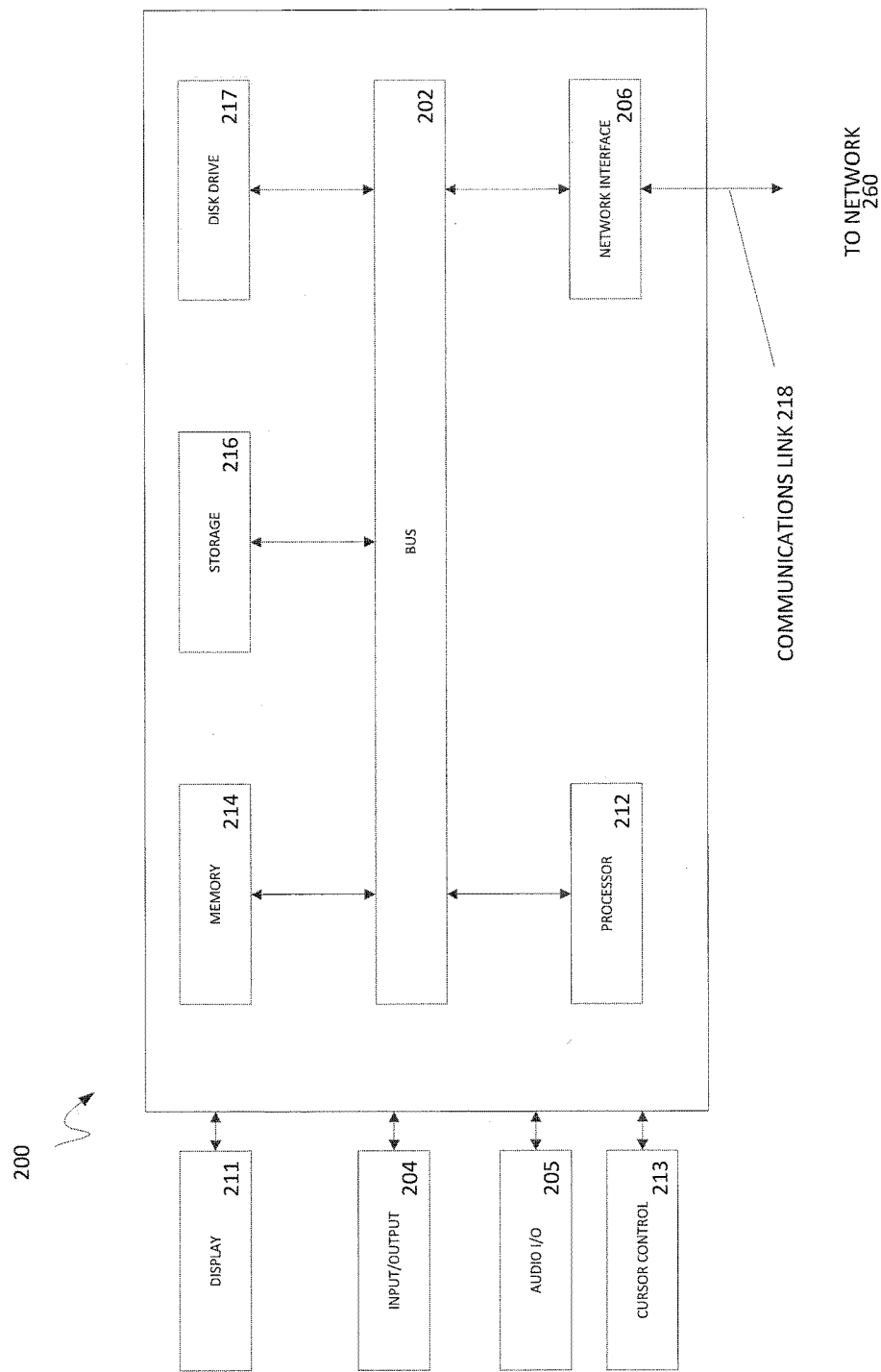
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touchscreen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal-oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer-readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
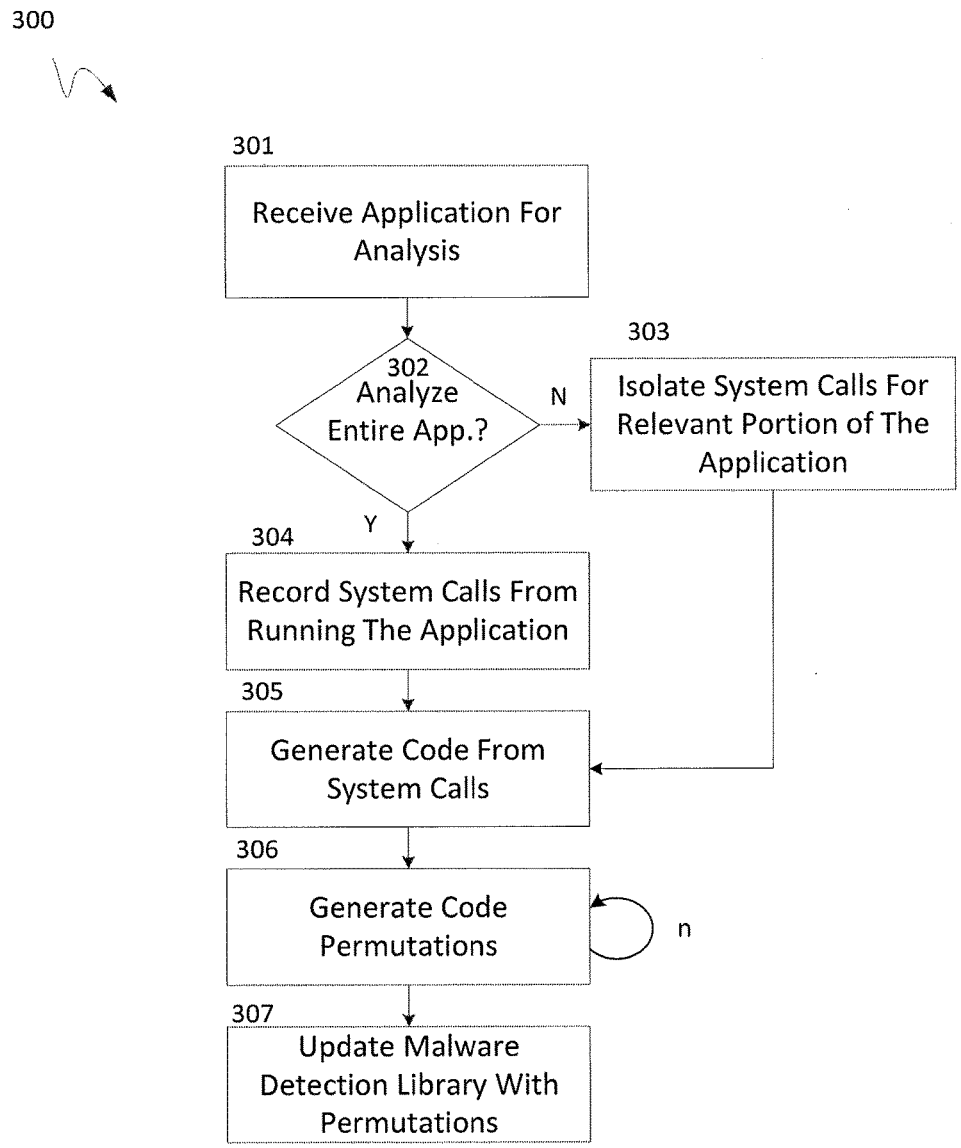
FIG. 3 is a flow diagram illustrating an exemplary malware prevention process.

FIG. 3 illustrates an exemplary process 300 for protecting a device against malware or other types of malicious code. Process 300 may include operation 301. At operation 301 the system may receive an application to analyze. In some examples, the application may be received in a binary format. In some examples, the application itself may be malware. In some examples, the application may be a non-malware application that has been infected with malware.

In some examples the system, at operation 302, may determine whether the entire application is going to be analyzed or whether a particular part, such as a malware part, of an application is going to be analyzed. In some examples, an indicator may be received at operation 301 indicating whether the system is to analyze the whole application or part of the application.

In some examples, the system, in response to the system determining that the system is analyzing a particular part of the application, may continue to operation 303 and separate or isolate system calls for the application that is relevant to the particular part. For example, when the relevant part is injected malware, the system may identify the system calls that the malware causes. In this manner, the system can analyze the relevant portion of the application.

In some examples, in response to determining that the entire application is going to be analyzed, the system may continue to operation 304 and run or execute the received application. The system may record the system calls and/or the system call traces that result from executing the application for analysis. In some examples, the system may run the application in a virtual and/or separate hardware environment to aid in identifying system calls caused by the application versus system calls caused by other applications. A virtual machine has the benefit of being easily copied, formatted, and configured as read only or non-persistent. However, there are some viruses that are capable of detecting and/or bypassing a virtual machine posing a danger to the underlying system and/or device. In contrast, a separate segregated machine has the benefit of being more secured, depending on how segregated the machine is from other systems, however using the segregated machine may become more cumbersome. For example, a separate hardware machine that is completely separate without any network communications would be the safest but also very cumbersome because it would use hard storage formats (e.g.

DVD, floppy disk, thumb drive, hot swappable drives, etc.). There would be little threat of malicious code piercing or escaping the environment.

In some examples, process 300 may include operation 305. At operation 305 the system may generate code for one or more programming languages from the system calls determined at operation 303 and/or operation 304. In some examples, the system may reverse compile code using the system calls determined at operation 303 and/or operation 304. In some examples, the system may predict the programming language that the application was written in before being compiled into a binary and generate the code using that programming language. When the code is compiled into a binary, there may be certain signatures left behind by the compiler that the system may use to determine the programming language that the code was written in. In some examples, the system may select the programming language based on the number of system calls, the complexity of the system calls, and/or the like. The complexity of the system calls may be determined using weighted values associated with the number of system calls, the type of system calls, the number of variables, the number of threads and/or file descriptors associated with the system calls, and/or the like.

In some examples, the system may generate code using multiple different programming languages. In this manner, the system may be able to create various permutations and/or evolutions of the program due to differences in the programming language. Some example programming languages may include, but are not limited to, assembly, Python, C, C++, Java, and/or the like.

In some examples, operation 305 may be skipped and the system may continue with the system calls rather than the generated code. In such an example, the system calls may be treated mutated/evolved.

In some examples, process 300 may include operation 306. At operation 306, the system may evolve, mutate, and/or create permutations of the code generated at operation 305. In some examples, the system may mutate code by mutating the code in one or more manners discussed in U.S. patent application Ser. No. 14/404,457, which is incorporated herein by reference in its entirety.

In some examples, the system may mutate code by replacing certain code commands with functionally equivalent but different commands; changing sequence of commands; replacing a select library call with a different, but functionally equivalent, library call; modifying code to change dynamic function calls to static invocations of relevant operating system calls; replicating lines of code; removing lines of code; rearranging lines of code; changing parameters; replacing calls to $3^{rd}$ party code; changing ports; changing libraries; combining code with other code; adding additional functionalities; combining the code with other code, such as other malicious or non malicious code; and/or the like. In some examples, the system may mutate system and/or library call traces, binary files, executables, and/or the like. In this manner, the system may be able to create different representations of a binary file or executable for the code. In some examples, the system may evolve, mutate, and/or create permutations of the code by mutating the network communications conducted by the code. For example, the system may inject changes to network communication code portions of the code, rewrite headers, and/or the like.

In some examples, the system may test the code to ensure that the code works and/or that the results from the code are the same or similar to the original code. In some examples, the system may compile the code into an executable (e.g. ELF for Linux®, PE for Windows®, Mach® for OSX®, and/or the like) for testing and/or for use in identifying a program signature associated with the code for detection.

In some examples, the system may continue to create new permutations or mutations of code by re-performing operation 306 on the newly generated code. The system may perform operation 306 n number of times. In some examples, the number n may be predetermined. In some examples, the number of times newly generated code is reprocessed through operation 306 may be based on one or more factors, such as how different the code is from the original code. In some examples, the system may calculate a difference value between the original code and the mutated code, and the system may continue to operation 307 when the difference value is over a threshold value and/or when the system has performed operation 306 above a certain threshold number of times. The system may use a counter to determine the number of times operation 306 has been performed. In some examples, the system may compile the generated code into an executable that can be run on a particular OS and/or CPU as executables for one OS and/or CPU may not work for another. In this manner, the system can protect multiple types of systems In some examples, process 300 may include operation 307. At operation 307, the system may update an application detection library, such as an anti-malware library of a malware detection system, with information on detecting code, executables, and/or execution of an executable based on the code developed in operation 306. In the example wherein the library that is updated is an anti-malware library, the computing devices with the anti-malware library would be able to detect new variants or similar variants of malicious code before a nefarious entity has had the opportunity to deploy them.

Figure 4:
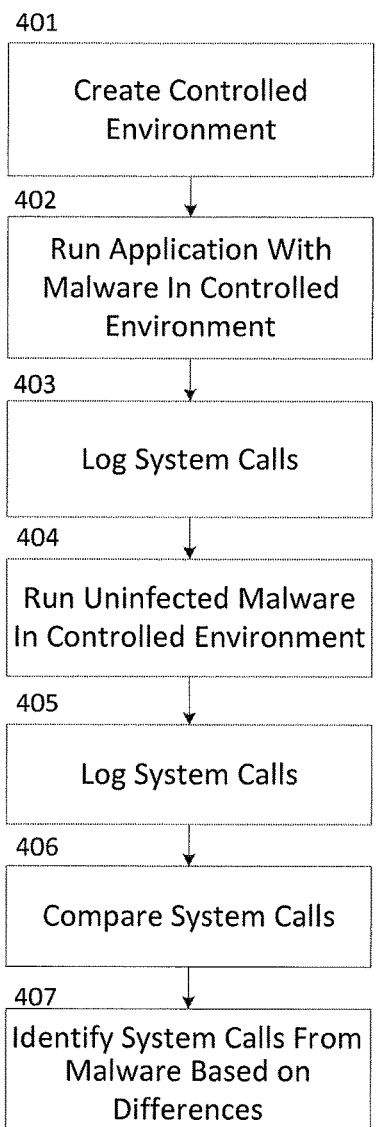
FIG. 4 is a flow diagram illustrating an exemplary process for identifying system calls associated with a program within an application.

FIG. 4 illustrates exemplary process 400 for differentiating part of an application, such as malware, from an application based on system calls. According to some embodiments, process 400 may be implemented on a device or system such as system 100 of FIG. 1. In some examples, operation 303 of FIG. 3 may implement process 400. For simplicity, process 400 is discussed in the perspective of isolating malware, but process 400 may be used to isolate other functions or parts of an application, such as changes or updates in an application.

Process 400 may include operation 401 of creating one or more controlled environments for isolating part of an application. In some examples, the controlled environment may be a virtual machine with a fresh installation of an operating system. In some examples, the controlled environment may be a clean installation of an operating system on an isolated device, such as a computer system without a network connection. In some examples, the controlled environment may include a simulated network. In some examples, if a controlled environment is on a virtual machine, the virtual machine may be isolated from the device running the virtual machine and/or any network communications. In some embodiments, the controlled environment may be created on a hard drive partition or a completely separate hard drive. In this manner, the system reduces the likelihood that any malware running in the controlled environment would infect another device and/or other parts of the system. In some examples, the controlled environment may have an application or an agent installed that intercepts system calls from other applications and/or executables. The agent may log or record system calls that it intercepts and determine which system calls to pass on to the kernel or ignore. Another benefit of the control environment would be that the system could more easily match system calls with different applications in the controlled environment. In some examples, the system may create multiple clones of the controlled environment with (or without) the application for comparing system calls.

Process 400 may include operation 402 of running an application infected with malware in the controlled environment. In some examples, running the application may comprise simply executing the application in the controlled environment. In some embodiments, running the application may comprise executing the application with predetermined inputs and/or functionalities. An application, depending on its complexity, may have one or more different modules, operation paths, and/or process forks and the system may cause the application to attempt one or more of these various modules, operation paths, and/or process forks. For example, a simple application or executable program may be to print "hello world" on the screen. In such an example, the system may simply execute the entire program. In other examples, the executable may be for a more complex program, such as a calculator program, and the system may provide input such that the system has the program call or use one or more of its functions, such as multiplication, clear, and addition. In this manner, the system can ensure that the malware portion of the application is run if the malware is infecting a particular function. In some examples, the system may run the application multiple times. The system calls caused by the application and the malware infecting the application may be different from different runs due to random entropy included in the malicious code or because of optimization and caching mechanisms included in the operating system. Thus, rerunning the application multiple times may help the system differentiate which system calls are from the application and which are from the malware.

Process 400 may include operation 403 wherein the system may record or log system calls to the operation system or kernel in the controlled environment running the application with the malware. In this manner, the system may capture system calls associated with the malware of the infected program as a result of the execution of the malware at operation 402. The log may maintain the order in which system calls are received, which applications requested the system call, time stamps, input information, output information, the type of system call, library calls, system call parameters, and/or other information recorded and/or other information.

Process 400 may include operation 404 wherein the system may also run the same application uninfected with the malware in the controlled environment. In some examples, the controlled environment may be a clone of the controlled environment used in operation 402. In this manner, a comparison can be made to determine differences, the differences being indicative of the malware. Furthermore, the system may execute the uninfected application in the same manner as the infected application in operation 404. The uninfected application may be run multiple times to catch changes or perturbations in system calls from each time the system runs the application. This way the system can determine which system calls are typical for the application.

Process 400 may include operation 405. At operation 405 the system may record and log the system calls to the operating system in the controlled environment that is running the uninfected application in a similar manner as operation 403. The system may record the library calls to the operating system, parameters given as inputs to the system calls, and/or other information as discussed in operation 403.

Process 400 may include operation 406. At operation 406 the system may compare the system calls, library calls, system call parameters, and/or other information recorded at operation 403 with the system calls, library calls, system call parameters, and/or other information recorded at operation 405 for differences. As discussed above, the system may run each of the infected and uninfected applications multiple times and create a log of the system calls for each run. In some examples, the system may merge differences between runs of the uninfected application and used the merged logs to compare with runs of the infected application.

For example, a small sequence of system calls on the first run of an uninfected application may be the following: (1) "Open," (2) "Read," (3) "Write," (4) "Close." Second instance of running the uninfected application may be the following: (1) "Mount," (2) "Open," (3) "Read," (4) "Close," (5) "Umount." The system may merge this into a simple log indicating that some of the system calls are optional. An example merged log may be the following: (1*) "Mount," (2) "Open," (3) "Read," (4*) "Write," (5) "Close," (6*) "Umount." The "*" may indicate that the application will not always perform those system calls in the sequence. The above merge is only an example, and the system may use other methods of merging logs.

The system may then compare for anomalies between logs associated with the infected application and the merged logs. For example, a sequence of system calls of the infected application may be the following: (1) "Open," (2) "Socket," (3) "Bind," (4) "Read," (5) "Listen," (6) "Accept," (7) "Write," (8) "Dup2," (9) "Execve," (10) "Umount." By comparing this log with the merged log, the system can determine that the following system calls are anomalies: (2) "Socket" (3) "Bind," (5) "Listen," (6) "Accept," (8) "Dup2," and (9) "Execve."

In some embodiments, the system may compare each log from running the uninfected application with each log from running the infected application. For the sake of efficiency, the system may knock out system calls that match from each comparison so that eventually the system calls that are anomalies are left. For example, comparing the example first run with the system calls of the infected application, the system would eliminate everything from the system calls of the infected application except for (2) "Socket" (3) "Bind," (5) "Listen," (6) "Accept," (8) "Dup2," (9) "Execve," and (10) "Umount." Then, comparing this result with the second instance would eliminate (10) "Umount." The remaining system calls would be the anomalies and/or associated with the malware that the system is attempting to identify.

Process 400 may include operation 407. At operation 407 the system may identify the system calls that it determines are different or anomalies at operation 406 and log those system calls as associated with the malware. The system may maintain the performance order of the system calls and any inputs/outputs associated with each of the system calls. In some examples, the system calls may be placed in JavaScript Object Notation (JSON) format or any other suitable format.

Figure 5:
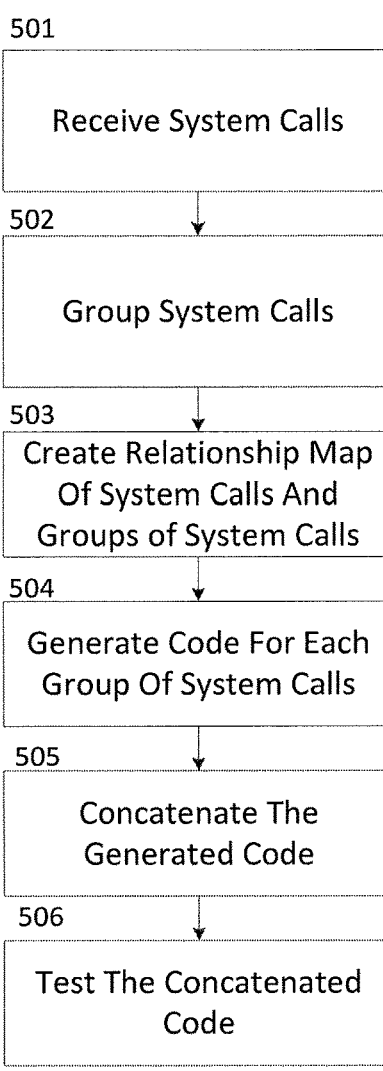
FIG. 5 is a flow diagram illustrating an exemplary process for recreating a program based on system calls.

FIG. 5 illustrates exemplary process 500 for decompiling system calls into code, such as assembly. According to some embodiments, process 500 may be implemented on a device or system such as system 100 of FIG. 1.

Process 500 may include operation 501. At operation 501, the system receives system calls associated with an execution of an application, such as malware. In some examples, the system may receive information indicative of the result of the application when executed and/or other information associated with the system calls, such as the order of the system calls, input/output data, time stamps, variables, and/or the like.

Process 500 may include operation 502 wherein the system may segregate system calls into groups, the groups having connected system calls. For example, an "Open" system call for opening a file may connect with a "Write" system calls, "Read" system calls, and/or a "Close" system call. In some examples, system calls groups may be segregated based on operating system structures such as file descriptor numbers in the case of Linux or Unix, as an example. In some examples, system calls may be grouped based on threads. In some embodiments, the system calls may be grouped based on another predetermined manner. Additionally, the system may maintain records of dependencies and/or links between system calls and/or groups. For example, a "Socket" system call may be in one group, which may open a socket on a device for a connection, with a related "Accept" system call segregated in another group, the "Accept" system call used for accepting a connection. Thus the "Accept" system call may be divided into a separate group, but the system may keep a record that it is a child thread associated with the "Socket" system call group. In some examples, the system may create a state tree with each of the system call groups or flows which may map the interconnections and links between system calls and the distinct system call groups.

Process 500 may include operation 503. At operation 503 the system may maintain a record and/or create a relationship map of file descriptors of the system calls, data position in a memory stack, input and output information, order of operation, and/or any other relationships between system calls and the input/output data associated with the system calls. In some examples, the system may maintain a record of system calls that create new file descriptors, threads, and/or otherwise indicate a distinct system call flow into a table for mapping flows or system call groups. This table may allow the system to keep track of the different groups of system calls for the application. Additionally, the system may create a table that maps each system call and its associated file descriptor, thread, and/or distinct system call flow to which it belongs.

Process 500 may include operation 504. At operation 504 may generate code (or segments of code), such as assembly code, for each of the groups of system calls. For example, the system may, for a group of system calls, determine variable information, input information, output information, registers for use (e.g. setting a register to zero or placing a pointer in the register), information in the memory stack, pointer locations, and/or the like for implementing the system calls, and generate assembly code for setting up the information, registers, and/or pointer information. In some examples, the system may use the information recorded in operation 502 to determine the input and output information to place in the memory stack. In some examples, the system may create assembly code for setting up variable information, input information, output information, registers for use (e.g. setting a register to zero or placing a pointer in the register), information in the memory stack, placeholders in the memory stack, pointer locations for data on the heap, information in the heap, and/or the like. Furthermore, the system may generate the assembly code such that it will preserve information and/or variables that would be passed between or used by multiple groups of system calls.

Process 500 may include operation 505. At operation 505, the system may combine the assembly code created for each of the groups of system calls in operation 504. The system may combine the code in an order based on the order of operation and relationships of system calls determined in operation 503.

Process 500 may include operation 506. At operation 506, the system may test that the combined assembly code from operation 505 causes the same result as the original application when compiled and/or executed. In some examples, the system may check to ensure that the combined code is functionally equivalent to the original code or application. In some examples, the system may run the original application to obtain a result and compare it to do the results that come from executing the code that operation 505 concatenates. In some examples, the system may compile the concatenated code in operation 505 into an executable that can be run on a particular OS and/or CPU, such as the OS and/or CPU of the system or controlled environment. In some examples, the system may have received results to compare with the results that come from executing the code from operation 505. In some examples, the original application may be a function or code that is intertwined or a part of another parent application. In such a case, the system may inject (or infect in the case of malware) the code from operation 505 into the same parent application. The system may run the parent application with the code from operation 505 to determine if a similar or same result occurs as the original application when it is run with the parent application.

The preceding disclosure is not intended to limit the present disclosure to the precise forms or particular fields of use disclosed. As such, it is contemplated that various alternate embodiments and/or modifications of the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory; and
    one or more hardware processors coupled to the non-transitory memory and configured to read instructions from the non-transitory memory to cause the system to perform operations comprising:
        obtaining an application infected with a malicious code;
        executing the application to log system calls associated with executing the application, wherein the logged system calls comprise system call parameters and time stamps corresponding to the system calls;
        extracting, from the logged system calls, a first portion of the logged system calls corresponding to the malicious code based on the system call parameters and the time stamps;
        decompiling the first portion of the logged system calls to generate a first programming source code corresponding to the malicious code;
        analyzing the first programming source code to determine a first result associated with executing the malicious code;
        mutating the first programming source code to create a second programming source code that is a variant of the malicious code; and
        executing the second programming source code to determine a second result from executing the second programming source code corresponds to the first result associated with executing the malicious code.

2. The system of claim 1, wherein the malicious code is a first malicious code, and wherein the operations further comprise updating a malware prevention system to detect a second malicious code based on the second programming source code.

3. The system of claim 1, wherein extracting the first portion of the logged system calls corresponding to the malicious code comprises comparing a first set of system calls logged from running the application infected with the malicious code against a second set of system calls logged from running a second application uninfected with the malicious code.

4. The system of claim 3, wherein the application infected with the malicious code is run in a first controlled environment.

5. The system of claim 4, wherein the second application uninfected with the malicious code is run in a second controlled environment different from the first controlled environment.

6. The system of claim 4, wherein the first controlled environment is a virtual machine.

7. The system of claim 1, wherein decompiling the first portion of the logged system calls to generate the first programming source code comprises:
segregating the first portion of the logged system calls into a plurality of groups;
generating a source code segment for each group in the plurality of groups; and
concatenating the source code segments generated for the plurality of groups.

8. A non-transitory machine readable medium having stored thereon machine-readable instructions executable to cause a machine to perform operations comprising:
obtaining a first executable code infected with a malicious code;
executing the first executable code to log system calls corresponding to executing the first executable code, wherein the logged system calls comprise system call parameters and time stamps corresponding to the system calls;
extracting, from the logged system calls, a first portion of the logged system calls corresponding to the malicious code based on the system call parameters and the time stamps;
decompiling the first portion of the logged system calls to generate a first programming source code corresponding to the malicious code;
analyzing the first programming source code to determine a particular result associated with executing the malicious code;
modifying the first programming source code to create a second programing source code that is a variant of the first programming source code; and
executing the second programming source code to verify the second programming source code produces the particular result associated with executing the malicious code.

9. The non-transitory machine readable medium of claim 8, wherein the operations further comprise updating a malware detection library based on the second programming source code.

10. The non-transitory machine readable medium of claim 8, wherein modifying the first programming source code comprises changing a communication protocol used by the first programming source code.

11. The non-transitory machine readable medium of claim 8, wherein the operations further comprise modifying the second programming source code to create a third programming source code different from the first programming source code and the second programming source code.

12. The non-transitory machine readable medium of claim 8, wherein the first executable code is executed in a controlled computing environment.

13. The non-transitory machine readable medium of claim 8, wherein decompiling the first portion of the logged system calls to generate the first programming source code comprises dividing the first portion of the logged system calls into a plurality of groups based on file descriptor numbers associated with the logged system calls.

14. The non-transitory machine readable medium of claim 8, wherein the operations further comprise detecting an application is infected with a malicious code based on the second programming source code.

15. A computer implemented method comprising:
executing, by one or more hardware processors, a first executable code that includes a malware to log system call data associated with executing the first executable code, wherein the system call data comprises an ordering of a plurality of system calls and parameters of the plurality of system calls;
extracting, by the one or more hardware processors from the logged system call data, a first portion of the plurality of system calls corresponding to the malware based on the ordering of the plurality of system calls and the parameters of the plurality of system calls;
decompiling, by the one or more hardware processors, the first portion of the plurality of system calls to generate a first programming source code corresponding to the malware;
creating, by the one or more hardware processors, a second programming source code by mutating the first programming source code, the second programming source code being a variation of the first programming source code; and
detecting a second executable code is infected with a variation of the malware based on the second programming source code.

16. The computer implemented method of claim 15, wherein logging the system call data comprises monitoring system calls caused by executing the first executable code.

17. The computer implemented method of claim 15, wherein the first portion of the plurality of system calls corresponding to the malware is extracted by determining a difference between the plurality of system calls associated with executing the first executable code and a second plurality of system calls associated with executing a third executable code.

18. The computer implemented method of claim 17, wherein the third executable code does not include the malware.

19. The computer implemented method of claim 15, wherein creating the second programming source code comprises replacing a first function in the first programming source code with a second function different from the first function.

20. The computer implemented method of claim 19, wherein the second function accomplishes a same objective as the first function.

* * * * *